(12) United States Patent
Watanabe et al.

(10) Patent No.: US 12,050,117 B2
(45) Date of Patent: Jul. 30, 2024

(54) INTER-SHAFT DISTANCE MEASURING DEVICE AND IMAGE FORMING APPARATUS

(71) Applicant: Konica Minolta, Inc., Tokyo (JP)

(72) Inventors: Yoshiaki Watanabe, Hachioji (JP); Yoshito Hashimura, Kanagawa (JP); Daisuke Fujiyama, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 370 days.

(21) Appl. No.: 17/558,096

(22) Filed: Dec. 21, 2021

(65) Prior Publication Data

US 2022/0196439 A1   Jun. 23, 2022

(30) Foreign Application Priority Data

Dec. 21, 2020   (JP) ................................. 2020-210911

(51) Int. Cl.
*G01D 5/22* (2006.01)
*G01B 7/02* (2006.01)
*H04N 1/00* (2006.01)

(52) U.S. Cl.
CPC ............. *G01D 5/2291* (2013.01); *G01B 7/02* (2013.01); *H04N 1/00034* (2013.01); *H04N 1/00042* (2013.01); *H04N 1/00082* (2013.01)

(58) Field of Classification Search
CPC .... G01D 5/2291; G01B 7/02; H04N 1/00034; H04N 1/00042; H04N 1/00082
See application file for complete search history.

(56) References Cited

U.S. PATENT DOCUMENTS

2010/0192394 A1* 8/2010 Cheng Tam ............. G01B 3/46
                                                           33/2 R
2018/0273327 A1* 9/2018 Fujioka .................... B65H 1/04

FOREIGN PATENT DOCUMENTS

| DE | 3724663 A1 | 2/1989 | |
|---|---|---|---|
| JP | 2005041585 A | 2/2005 | |
| JP | 2005041585 A * | 2/2005 | ............... B65H 5/06 |

OTHER PUBLICATIONS

CNIPA First Office Action for corresponding CN Application No. 202111571215.5; Issued Apr. 1, 2024; 15 pages.

* cited by examiner

*Primary Examiner* — Jermele M Hollington
*Assistant Examiner* — Taqi R Nasir
(74) *Attorney, Agent, or Firm* — CANTOR COLBURN LLP

(57) ABSTRACT

Provided is an inter-shaft distance measuring device for measuring a distance between two shafts or an amount of a change in the distance that includes: measuring elements that are respectively in contact with peripheral surfaces of the two shafts at a time of measurement and that are used as measurement references; a moving mechanism that includes an elastic member and that holds the measuring elements to move the measuring elements relatively and adds a force in opposite directions separating the measuring elements by an elastic force of the elastic member; and a measurer that measures the change in the distance between the measuring elements. In a state at the time of the measurement, the measuring elements between the two shafts add a pressing force by the moving mechanism respectively to the two shafts in directions widening the distance, and the state at the time of the measurement is maintainable.

20 Claims, 8 Drawing Sheets

INTER-SHAFT DISTANCE MEASURING DEVICE AND IMAGE FORMING APPARATUS

CROSS-REFERENCE TO RELATED APPLICATIONS

The present invention claims priority under 35 U.S.C. § 119 to Japanese Patent Application No. 2020-210911 filed on Dec. 21, 2020, the entire content of which is incorporated herein by reference.

BACKGROUND

Technological Field

The present invention relates to an inter-shaft distance measuring device and an image forming apparatus.

Description of the Related Art

In an apparatus with a pair of rollers such as an image forming apparatus, an inter-shaft distance between shafts of the pair of rollers affects processing properties of the apparatus, and it is thus necessary to measure the distance in each apparatus as a finished product.

JP2005041585A discloses an inter-shaft distance measuring means composed of a light emitting element (light emitting diode) and a light receiving element (photodiode). In the inter-shaft distance measuring means in JP2005041585A, a light emitted from the light emitting diode reaches a shaft of one of the rollers, and the light emitting diode and the photodiode are fixed such that the light enters the photodiode. The inter-shaft distance is thereby measured by a change in the intensity of the reflected light according to movement of the shaft.

SUMMARY

However, in a finished product, the inter-shaft distance may not be measured in some cases where there is not enough space around the shafts for a measuring device.

It is difficult to measure the inter-shaft distance in a case where shafts are moved as in a fixing unit of an image forming apparatus and a change in the inter-shaft distance along with the movement is to be measured. It is extremely difficult to measure the inter-shaft distance when there is not enough space around the shaft and the shaft is moved.

In a case where a measuring means disclosed in JP005041585A or other optical measuring means such as a laser length measuring device, it is difficult to solve the above-described problems, because it is necessary to meet the requirements that a light emitter and a light receiver can be placed and that nothing except a measured object blocks the light in the path of measurement light. It is possible to track the change in the inter-shaft distance with an optical measuring means, but it is impossible to track the change when the measurement target shaft is out of the range of emission of the measurement light. In order to expand the tracking range, it is necessary to expand the ranges of light emission and light reception, which makes the device larger and requires more space around the shaft.

In a case where a hand-held measurer such as a caliper gauge, a micrometer, and a caliper is used for measurement, it is necessary that a hand of a person can enter the device and carry the measurer to the measurement position for measurement actions and that the neighboring components do not block the measurement actions, and moreover, the measurement values may be unstable because the accuracy of measurement depends on the skill of the person.

The present invention has been conceived in view of the above-described problems in the prior art, and has an object of providing an inter-shaft distance measuring device that can stably and accurately measure the inter-shaft distance while tracking the change in the inter-shaft distance.

To achieve at least one of the abovementioned objects, an inter-shaft distance measuring device for measuring a distance between two shafts or an amount of a change in the distance reflecting one aspect of the present invention includes:

a first measuring element that is in contact with a first peripheral surface of a first shaft of the two shafts at a time of measurement and that is used as a first measurement reference;

a second measuring element that is in contact with a second peripheral surface of a second shaft of the two shafts at the time of the measurement and that is used as a second measurement reference;

a moving mechanism that includes an elastic member and that holds the first measuring element and the second measuring element so as to move the first measuring element and the second measuring element relatively to each other and adds a force in opposite directions in which the first measuring element and the second measuring element are separated from each other by an elastic force of the elastic member; and a measurer that measures the change in the distance between the first measuring element and the second measuring element caused by the moving mechanism, wherein in a state at the time of the measurement, the first measuring element and the second measuring element inserted between the two shafts add a pressing force by the moving mechanism respectively to the two shafts in directions in which the distance between the two shafts is widened, and the state at the time of the measurement is maintainable.

To achieve at least one of the abovementioned objects, an image forming apparatus reflecting another aspect of the present invention includes the inter-shaft distance measuring device described above.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION OF THE EMBODIMENTS

Hereinafter, embodiments of the present invention are described with reference to the drawings. The following is embodiments of the present invention and does not limit the present invention.

[Configuration of Image Forming Apparatus]

Figure 1:
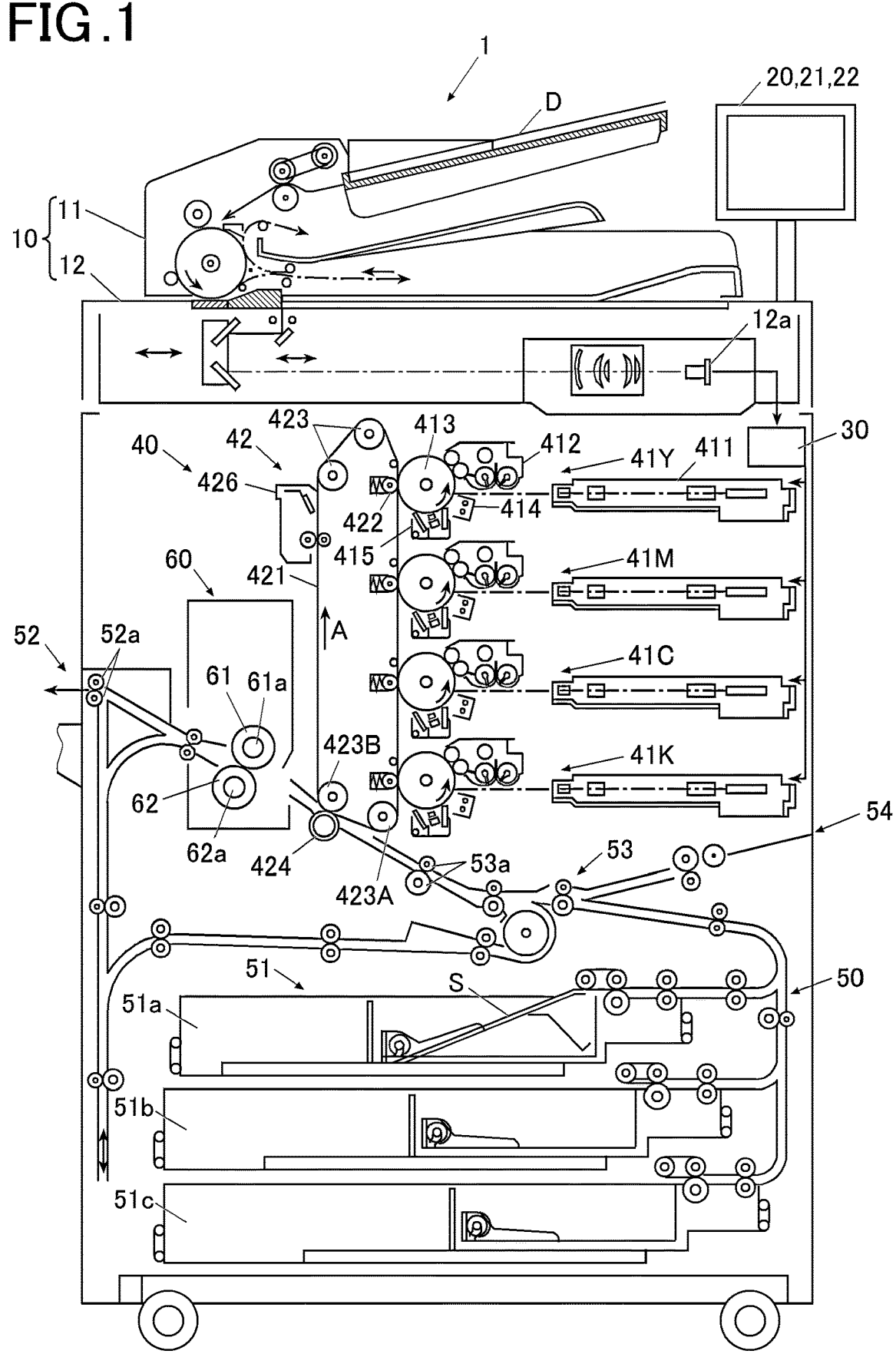
FIG. 1 is a front view of an image forming apparatus schematically showing an overall configuration.
Figure 2:
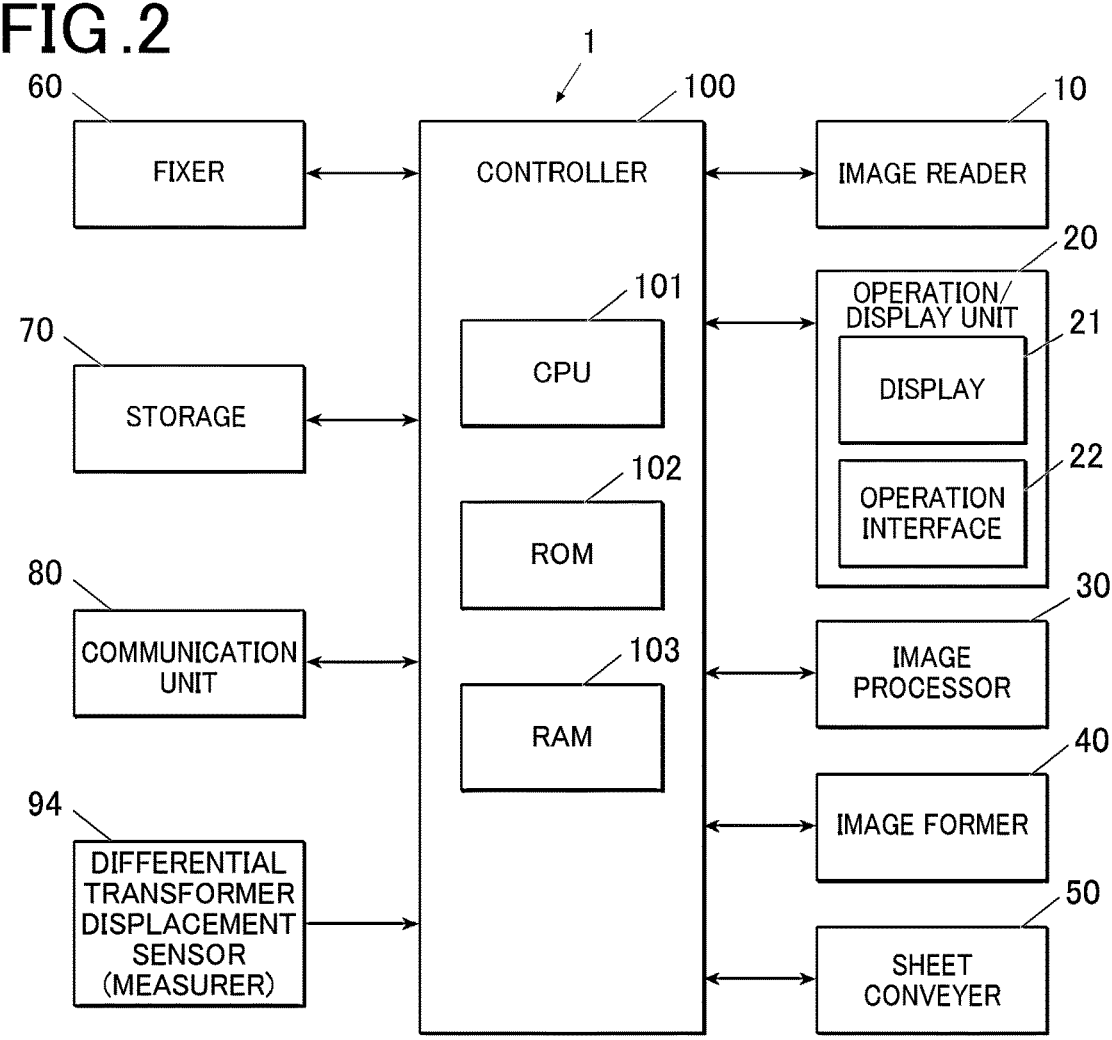
FIG. 2 is a block diagram showing a functional configuration of the image forming apparatus.

FIG. 1 schematically shows an overall configuration of an image forming apparatus 1 according to this embodiment. FIG. 2 is a block diagram showing a main functional configuration of the image forming apparatus 1 according to this embodiment.

The image forming apparatus 1 shown in FIGS. 1, 2 is an electrophotographic color image forming apparatus using an intermediate transfer system. In the image forming apparatus 1, toner images formed with colors of yellow (Y), magenta (M), cyan (C), and black (K) on photoconductive drums 413 are transferred onto an intermediate transfer belt 421 (first transfer) so as to be superposed on one another, and the toner image of four colors is transferred onto a sheet of paper (second transfer). An image is thereby formed.

The image forming apparatus 1 employs the tandem method in which the photoconductive drums 413 for the four colors of Y, M, C, and K are disposed in series in the running direction of the intermediate transfer belt 421 and the toner images of the respective colors are sequentially transferred onto the intermediate transfer belt 421.

As shown in FIG. 2, the image forming apparatus 1 includes an image reader 10, an operation/display unit 20, an image processor 30, an image former 40, a sheet conveyer 50, a fixer 60, a storage 70, a communication unit 80, and a controller 100.

The controller 100 includes a central processing unit (CPU) 101, a read only memory (ROM) 102, and a random access memory (RAM) 103. The CPU 101 reads out the program corresponding to the processing from the ROM 102, loads the program to the RAM 103, and centrally controls the operation of each block of the image forming apparatus 1 shown in FIG. 2 in cooperation with the loaded program.

The image reader 10 includes an automatic document sheet feeding device 11 called an auto document feeder (ADF) and a document image scanning device 12 (scanner).

The automatic document sheet feeding device 11 conveys a document D placed on the document tray with the conveyance mechanism to the document image scanning device 12. The automatic document sheet feeding device 11 can continuously and ceaselessly read images (on double faces) of a number of sheets of the document D placed on the document tray at once.

The document image scanning device 12 reads the document image by optically scanning the document transferred onto the platen glass from the automatic document sheet feeding device 11 or placed on the platen glass and imaging the reflected light from the document on the receiving face of a CCD (charge coupled device) sensor 12a. The image reader 10 generates input image data based on the reading results by the document image scanning device 12. The input image data is processed by predetermined image processing in the image processor 30.

The operation/display unit 20 is, for example, a liquid crystal display (LCD) with a touch panel, and functions as a display 21 and an operation interface 22. The display 21 displays various operation screens, image conditions, and operation states of the functional components according to display control signals input from the controller 100. The operation interface 22 includes various operation keys such as numeric keys and a start key, and the operation interface 22 receives various input operations by the user and outputs operation signals to the controller 100.

The image processor 30 includes a circuit that processes image data (input image data) of an input job by digital image processing according to the initial setting or the user setting. For example, the image processor 30 performs gradation correction based on gradation correction data (gradation correction table) under the control of the controller 100. The image processor 30 processes the input image data by various kinds of correction such as color correction and shading correction and compression processing in addition to gradation correction. The image former 40 is controlled based on the image data processed as described above.

The image former 40 includes image forming units 41Y, 41M, 41C, and 41K, for forming images of colored toners of components Y, M, C, and K based on the processed image data and an intermediate transfer unit 42.

The image forming units 41Y, 41M, 41C, and 41K for components Y, M, C, and K are configured in the same way. For convenience of illustration and description, the parts common to the image forming units 41Y, 41C, 41M, and 41K are denoted by the same reference numerals. In order to distinguish each of the common components, "Y", "M", "C", or "K" is added to the corresponding reference numeral. In FIG. 1, only the components of the image forming unit 41Y for the Y color component have reference numerals, and the reference numerals of the components of the other image forming units 41M, 41C, and 41K are omitted.

Each image forming unit 41 includes an exposure device 411, a developing device 412, a photoconductive drum 413 (image carrier), a charging device 414, and a drum cleaning device 415.

The photoconductive drum 413 is, for example, a negatively chargeable organic photoconductor (OPC) in which an under coat layer (UCL), a charge generation layer (CGL), and a charge transport layer (CTL) are laminated in order on the peripheral surface of an electroconductive cylindrical aluminum body (aluminum tube). The CGL consists of an organic semiconductor made of a resin binder (e.g. polycarbonate resin) and a charge generation material (e.g. phthalocyanine pigment) dispersed in the resin binder. The CGL generates pairs of positive charges and negative charges when exposed by the exposing device 411. The CTL consists of a resin binder (e.g. polycarbonate resin) and a hole transport material (electron-donating nitrogen-containing compounds) dispersed in the resin binder. The CTL transfers the positive charges generated at the CGL to the surface of the CTL.

The controller 100 causes the photoconductive drums 413 to rotate at a constant peripheral speed (e.g., 665 mm/s) by regulating driving signals sent to a driving motor(s) (not shown in the drawings) that rotates the photoconductive drums 413.

The charging device 414 negatively and uniformly charges the surface of the photoconductive drum 413. The exposure device 411 consists of a semiconductor laser, for example, and emits laser light corresponding to images of its color component onto the photoconductive drum 413. The positive charges generated at the CGL of the photoconductive drum 413 by the exposure are transferred to the surface of the CTL and neutralize the negative charges on the surface of the photoconductive drum 413. Accordingly, an electrostatic latent image of the corresponding color component is formed on the surface of the photoconductive drum 413 by the electric potential difference between the exposed and non-exposed regions.

The developing device 412 uses a two-component developer that contains toner and carrier. The developing device 412 causes toner of its color component to adhere to the surface of the photoconductive drum 413 to visualize the electrostatic latent image. The developing device 412 thereby forms a toner image.

The type of carrier is not specifically limited. A well-known widely used carrier can be used, such as a binder carrier and a coated carrier. The diameter of a carrier particle is preferably 15 to 100 μm, but is not limited thereto.

Similarly, the type of toner is not specifically limited. A well-known widely used toner can be used. For example, a binder resin that contains a colorant and as necessary a charge controlling agent and/or a separating agent and that is treated with an external additive can be used. The diameter of a toner particle is preferably around 3 to 15 μm but is not limited thereto.

The drum cleaner 415 has a drum cleaning blade or the like that slidingly contacts the surface of the photoconductive drum 413. The drum cleaner 415 removes the residual toner on the surface of the photoconductive drum 413 after the first transfer.

The intermediate transfer unit 42 includes an intermediate transfer belt 421, first transfer rollers 422 (transfer members), supporting rollers 423, a second transfer roller 424, a belt cleaner 426, and a sensor 427.

The intermediate transfer belt 421 is an endless belt and is stretched around the supporting rollers 423 to be a loop. At least one of the supporting rollers 423 is a driving roller, and the other support rollers are driven rollers. For example, the roller 423A, which is provided downstream from the first transfer roller 422 for the K-color component in the moving direction of the belt, is preferable as the driving roller. This makes it easy to keep the moving speed of the belt uniform at the first transfer points. Rotation of the driving roller 423A makes the intermediate transfer belt 421 move at a constant speed in the direction of the arrow A.

The first transfer rollers 422 are provided at the inner circumferential surface side of the intermediate transfer belt 421 so as to face their respective photoconductive drums 413. Each of the first transfer rollers 422 is pressed against the corresponding photoconductive drum 413 with the intermediate transfer belt 421 in between to form a first transfer nip part. At the first transfer nip part, a toner image is transferred from the photoconductive drum 413 to the intermediate transfer belt 421.

The second transfer roller 424 is provided on the outer circumferential surface side of the intermediate transfer belt 421 so as to face the roller 423B (hereinafter called backup roller 423B), which is provided downstream from the driving roller 423A in the belt moving direction. The second transfer roller 424 is pressed against the backup roller 423B with the intermediate transfer belt 421 in between to form a second transfer nip part. At the second transfer nip part, a toner image is transferred from the intermediate transfer belt 421 to a sheet of paper.

When the intermediate transfer belt 421 passes through the first transfer nip parts, the toner images formed on the surfaces of the photoconductive drums 413 are sequentially transferred onto the intermediate transfer belt 421 so as to be superposed on top of one another (first transfer). More specifically, a first transfer bias is applied to each first transfer roller 422, so that charges having reverse polarity to that of the toner are given to the inner surface side of the intermediate transfer belt 421 (the side abutting the first transfer rollers 422). Accordingly, the toner images are electrostatically transferred onto the intermediate transfer belt 421.

Thereafter, when the sheet passes through the second transfer nip part, the toner image on the intermediate transfer belt 421 is transferred onto the sheet (second transfer). More specifically, a second transfer bias is applied to the second transfer roller 424, so that charges having reverse polarity to that of the toner are given to the inner surface side of the sheet (the side abutting the second transfer roller 424). Accordingly, the toner image is electrostatically transferred onto the sheet. The sheet on which the toner image is transferred is then conveyed to the fixer 60.

The belt cleaner 426 includes a belt cleaning blade 426 that slidingly contacts the surface of the intermediate transfer belt 421 and removes the toner remaining on the surface of the intermediate transfer belt 421 after the second transfer. Instead of the second transfer roller 424, a belt-type second transfer unit may be used. The belt-type second transfer unit has a second transfer belt stretched around supporting rollers including a second transfer roller to be a loop.

Figure 3:
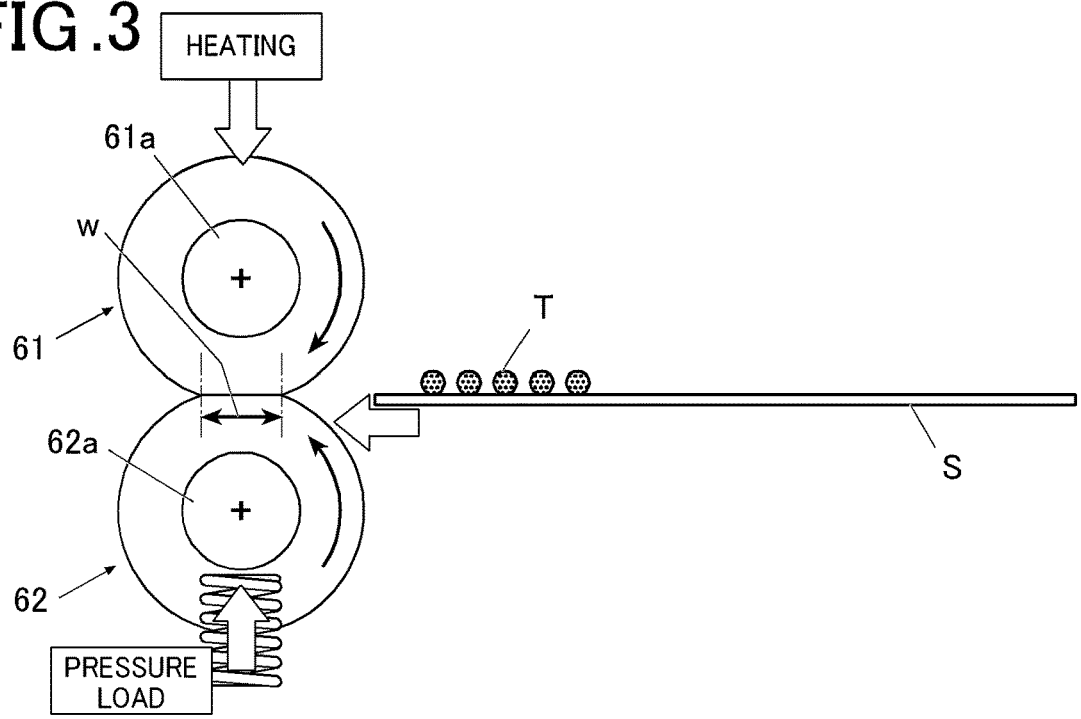
FIG. 3 is a front view of a fixer schematically showing a configuration.

The fixer 60 heats and pressurizes, at a fixing nip part, the conveyed sheet on which the toner image has been transferred by the second transfer to fix the toner image to the sheet, as shown in FIG. 3. As shown in FIG. 3, the fixer 60 presses an upper roller 61 and a lower roller 62 against each other to form a fixing nip on which a nip pressure is applied in a range of a nip width W in the sheet passing direction, and the image of the toner T is fixed onto a sheet S by pressurizing and heating the sheet S with an appropriate nip pressure while the sheet S passes through an appropriate nip width W.

The sheet conveyer 50 includes a sheet feeder 51, a sheet ejector 52, and a conveyance path unit 53. The sheet feeder 51 has three sheet feeding tray units 51a, 51b, and 51c that house sheets of paper (standardized paper and/or special paper) by predetermined types, the sheets being sorted according to the basis weight and/or the size. The conveyance path unit 53 has pairs of conveying rollers, such as a pair of register rollers 53a.

The sheets housed in the sheet feeding tray units 51a to 51c are sent out one by one from the top and conveyed to the image former 40 by the conveyance path unit 53. A register roller unit having the pair of register rollers 53a registers the fed sheet and adjusts timing of conveying the sheet. The image former 40 transfers the toner image on the intermediate transfer belt 421 onto one side of the sheet as the second transfer. The fixer 60 then performs fixing on the sheet. The sheet on which the image has been formed is ejected outside the apparatus by the sheet ejector 52 that has sheet ejecting rollers 52a.

The sheets may be long paper or rolled paper. The sheet of long paper/rolled paper is stored in a sheet feeding device (not shown in the drawings) connected to the image forming apparatus 1. The sheet is supplied to the image forming apparatus 1 from the sheet feeding device through the sheet feeding opening 54 and then sent out to the conveyance path unit 53.

The storage 70 consists of, for example, a nonvolatile semiconductor memory (flash memory) and/or a hard disc drive. The storage 70 stores various kinds of data including information on various settings of the image forming apparatus 1.

The communication unit 80 consists of a communication control card, such as a local area network (LAN) card, and exchanges data with external devices (e.g. personal computer) connected to communication networks, such as a LAN and a wide area network (WAN).

[Inter-Shaft Distance Measurement]

Next, an inter-shaft distance measuring device is described, where a distance between the upper roller 61 and the lower roller 62 of the fixer 60 is measured as an example.

First Embodiment

Figure 4:
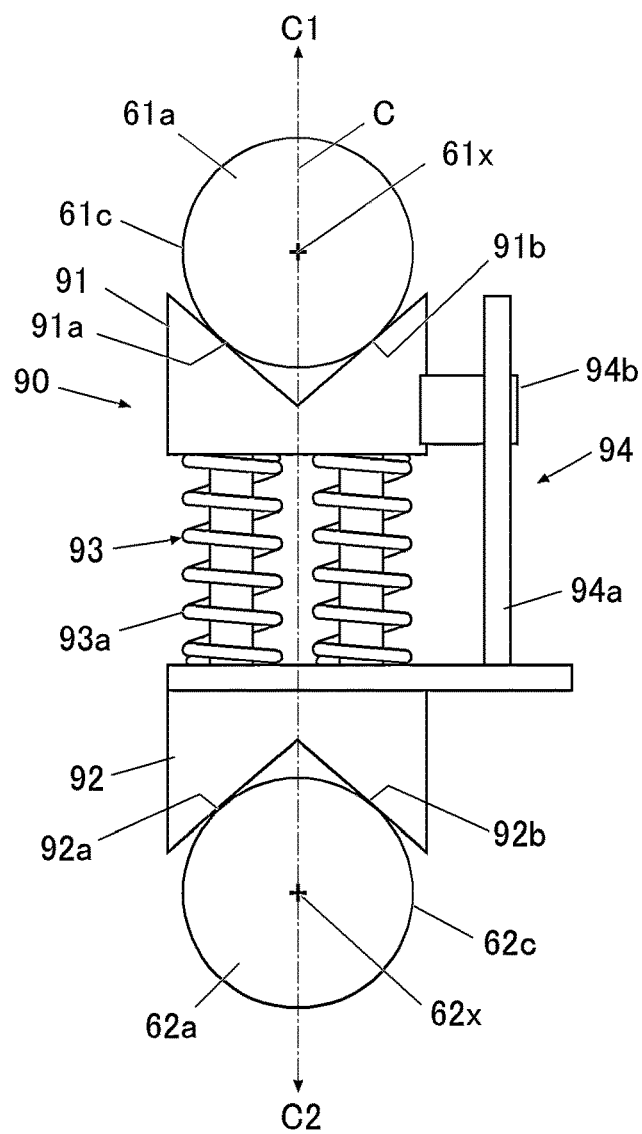
FIG. 4 is a front view of an inter-shaft distance measuring device and two shafts to be measured in a first embodiment.

FIG. 4 shows two shafts 61a and 62a to be measured. The shaft 61a is a metal rod that forms a shaft of the upper roller 61. The other shaft 62a is a metal rod that forms a shaft of the lower roller 62. As shown in FIG. 4, an inter-shaft distance measuring device 90 is installed in a state at the time of measurement of the distance between the shafts 61a and 62a.

The inter-shaft distance measuring device 90 is an inter-shaft distance measuring device for measuring a distance between two shafts or a change amount of that distance, and includes a first measuring element 91, a second measuring element 92, a linear movement mechanism (moving mechanism) 93, and a measuring means (measurer) 94.

The first measuring element 91 is in contact with a peripheral surface 61c of the shaft 61a of the two shafts 61a and 62a at the time of measurement, and makes one measurement reference.

The second measuring element 92 is in contact with a peripheral surface 62c of the other shaft 62a of the two shafts 61a and 62a, and makes the other measurement reference.

The linear movement mechanism 93, which includes an elastic member 93a, supports the first measuring element 91 and the second measuring element 92 to move linearly along a line C relatively, and presses the first measuring element 91 and the second measuring element 92 in opposite directions (directions C1, C2) to separate the first measuring element 91 and the second measuring element 92 from each other by an elastic force of the elastic member 93a. A guide mechanism for the linear movement mechanism 93 may be of a guide rod and a cylinder, a guide roll and a guide roller, a linkage, or any other mechanism. The movement is not limited to the linear movement of this embodiment, and may take any other trajectories such as a curve and a diagonal.

The measuring means 94 is installed to measure the change in the distance between the first measuring element 91 and the second measuring element 92 along the line C by the linear movement mechanism. The measuring means may be a mechanical length measuring device such as a ruler and a micrometer, or any other electronic length measuring device. In the example shown in FIG. 4, a length measuring device using a differential transformer displacement sensor 94 as one of electronic length measuring devices. The differential transformer displacement sensor 94, which includes a rod 94a and a detection head 94b, is an electro-mechanical transducer that can convert linear movements of the detection head 94b guided by the rod 94a into corresponding electrical signals. As shown in FIG. 4, the rod 94a is fixed to one measuring element (the second measuring element 92 in FIG. 4), and the detection head 94b is fixed to the other measuring element (the first measuring element 91 in FIG. 4) such that an axial direction of the rod 94a, namely a direction of measuring the change by the differential transformer displacement sensor 94, is in the direction parallel to the line C.

Thus, the change in the distance between the first measuring element 91 and the second measuring element 92 may be extracted as electrical signals from the differential transformer displacement sensor 94.

As shown in FIG. 4, the inter-shaft distance measuring device 90 may maintain the state at the time of maintenance in which the first measuring element 91 and the second measuring element 92 inserted between the two shafts 61a and 62a apply a pressing force respectively to the two shafts 61a and 62a in directions (the directions C1 and C2) in which the interval between the two shafts 61a and 62a are widened by the linear movement mechanism 93.

When observed in the axial direction of the two shafts 61a and 62a as shown in FIG. 4, the first measuring element 91 is in contact with the peripheral surface 61c at two points 91a and 91b which are on opposite sides of each other with respect to a boundary of the line C that passes through the center line 61x of the one shaft 61a and the center line 62x of the other shaft 62a at the time of measurement. This increases the stability of the shaft 61a at a fixed position with respect to the first measuring element 91.

The second measuring element 92 is in contact with the peripheral surface 62c at two points 92a and 92b which are on opposite sides of each other with respect to a boundary of the line C at the time of measurement as shown in FIG. 4. This increases the stability of the shaft 62a being at a fixed position with respect to the second measuring element 92.

The above-described structure for the contact at two points may be applied to only one of the first measuring element 91 and the second measuring element 92.

As shown in FIG. 4, when observed in the axial direction of the two shafts 61a and 62a, the center of the first measuring element 91 and the center of the second measuring element 92 are on a line of action of a combined force of the elastic force of the elastic member 93a. That is, the line of action of the combined force of the elastic force of the elastic member 93a coincides with the straight line C, and the line C passes through the center of the first measuring element 91 and the center of the second measuring element 92. This arrangement prevents a moment from being generated in the linear movement mechanism 93 and allows a smooth linear movement. Since the linear movement mechanism 93 in addition to the first measuring element 91 and the second measuring element 92 may be disposed in an area between the two shafts 61a and 62a, the inter-shaft distance measuring device 90 may be disposed in the space between the two shafts 61a and 62a in a space-saving manner.

The inter-shaft distance measuring device 90 as described above may be disposed between the two shafts 61a and 62a in a space-saving manner.

As described above, in the inter-shaft distance measuring device 90, the first measuring element 91 and the second measuring element 92 inserted between the two shafts 61a and 62a are maintained in the state at the time of measurement where a pressing force is added to the two shafts 61a and 62a in directions in which the distance between the two shafts is widened (the directions C1 and C2) by the linear movement mechanism 93, and the inter-shaft distance measuring device 90 includes the above-described measuring means 94. Therefore, even when the distance between the two shafts 61a and 62a is varied, the first measuring element 91 follows the shaft 61a while being in contact constantly with the peripheral surface 61c of the shaft 61a and the second measuring element 92 follows the shaft 62a while being in contact constantly with the peripheral surface 62c of the shaft 62a. As a result, the change in the distance between the two shafts 61a and 62a is reflected in the change in the distance between the first measuring element 91 and the second measuring element 92, and thereby the change can be measured by the measuring means 94.

Thus, the inter-shaft distance measuring device 90 follows the change in the inter-shaft distance by the elastic force and maintains the state at the time of measurement, and thereby the inter-shaft distance may be stably and accurately measured.

And since the measuring elements 91 and 92 contact the metal rods 61a and 62a which are the shafts, the inter-shaft distance may be accurately measured.

As described above, when the inter-shaft distance measuring device 90 is used for the fixing rollers 61 and 62 of the fixer 60, the inter-shaft distance may be measured when the fixing rollers 61 and 62 are pressed against each other. Therefore, it is possible to detect whether the nip pressure and the nip width of the fixing rollers 61 and 62 are appropriate and control the inter-shaft distance of the rollers 61 and 62 based on the detection result to get an appropriate nip pressure and nip width.

Since the inter-shaft distance measuring device contacts the two shafts to be measured, the device is preferably composed of a material that can resist the temperature range of the usage environment of the two shafts. Since the device is used for the fixing rollers 61 and 62 of the fixer 60 that generates heat for the fixing action in this embodiment, the device is preferably composed of a material that resists the temperature range of the usage environment of the fixing rollers 61 and 62. This makes it possible to continuously use the device while the inter-shaft distance measuring device 90 is installed in the state at the time of measurement including when the image forming apparatus 1.

The inter-shaft distance measuring device 90 may be provided as a component of the image forming apparatus 1 which is manufactured, inspected, and shipped to be used by users, or may be attached at the time of inspection before shipping and removed before shipping.

Measurement is performed with a display that shows measurement values based on output signals of the above-described electronic length measuring device 94. The display may be provided externally to the image forming apparatus. The controller 100 and the operation/display unit 20 of the image forming apparatus 1 may be used as the display. In the latter case, the controller 100 is configured to receive output signals of the inter-shaft distance measuring device 90 (differential transformer displacement sensor 94), and monitor the distance between the two shafts based on the output signals or control the image formation conditions as shown in FIG. 2. In monitoring, the measurement log is recorded and output to be displayed on the operation/display unit 20 as necessary for external notification. Examples of the control of the image formation conditions include: modifying the distance between the fixing rollers 61 and 62 as described above to make a nip pressure and nip width appropriate for printing; and modifying the other image formation conditions without modifying the distance between the fixing rollers 61 and 62.

The inter-shaft distance measuring device 90 includes a calibration master as a reference of the design dimensions of the measured target.

Figure 5A:
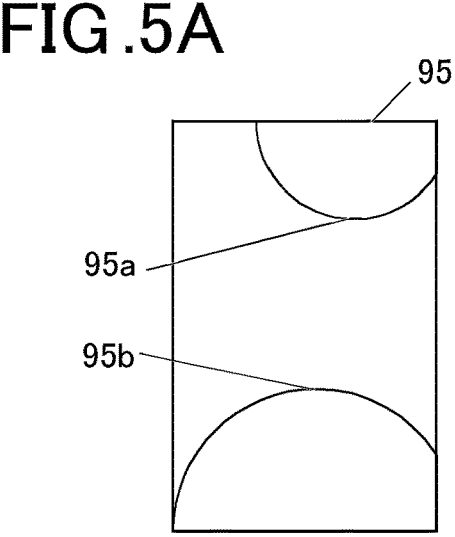
FIG. 5A is a front view of a calibration master.
Figure 5B:
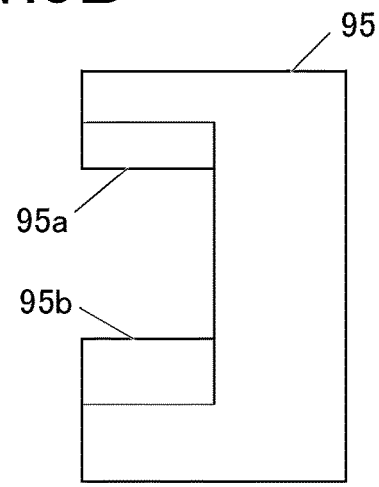
FIG. 5B is a side view of the calibration master.

The calibration master may be a master standard imitating the contacting surfaces of the measuring elements of the two shafts to be measured by which a known constant inter-shaft distance is reproduced and retained permanently. For example, as shown in FIG. 5, the calibration master 95 is accurately formed by machining of a metal block so as not to be easily deformed, and has a contact surface 95a and a contact surface 95b corresponding to the contact surfaces of the measuring elements of the two shafts to be measured.

In the calibration operation, the inter-shaft distance measuring device 90 is set in the state at the time of measurement for the calibration master 95 by causing the first measuring element 91 and the second measuring element 92 respectively to contact the contacting surface 95a and the contacting surface 95b. Measurement is thereby performed and the measurement result is stored in the above-described display or the like.

As the reference absolute value of the inter-shaft distance in the above-described calibration, the measurement accuracy is ensured thereafter. Further, as the calibration master 95 in the above-described embodiment reproduces the reference value of the design dimension, a deviation from the reference value of the design dimension may be measured by measuring a difference from the measured inter-shaft distance for the calibration master 95.

This makes it possible to accurately determine the acceptability of the product and readjustment.

The point zero of the measurement based on the electronic length measuring device 94 may be set in order to measure a difference from the reference value of the design dimensions. The setting of the point zero may be performed on the above-described display.

When the inter-shaft distance measuring device 90 is set in the state at the time of measurement for the two shafts 61a and 62a, the pressing force is added in the directions in which the interval between the two shafts 61a and 62a is widened, which may result in a deviation relatively to when no pressing force is added.

Therefore, the pressing force on the two shafts 61a and 62a by the inter-shaft distance measuring device 90 is in a range that does not affect the measurement accuracy of the measuring means 94.

The pressing force on the two shafts 61a and 62a by the inter-shaft distance measuring device 90 is configured, for example, to be 1% or less of the fixing pressing load by the fixer 60 so as not to affect the measurement accuracy.

Figure 6:
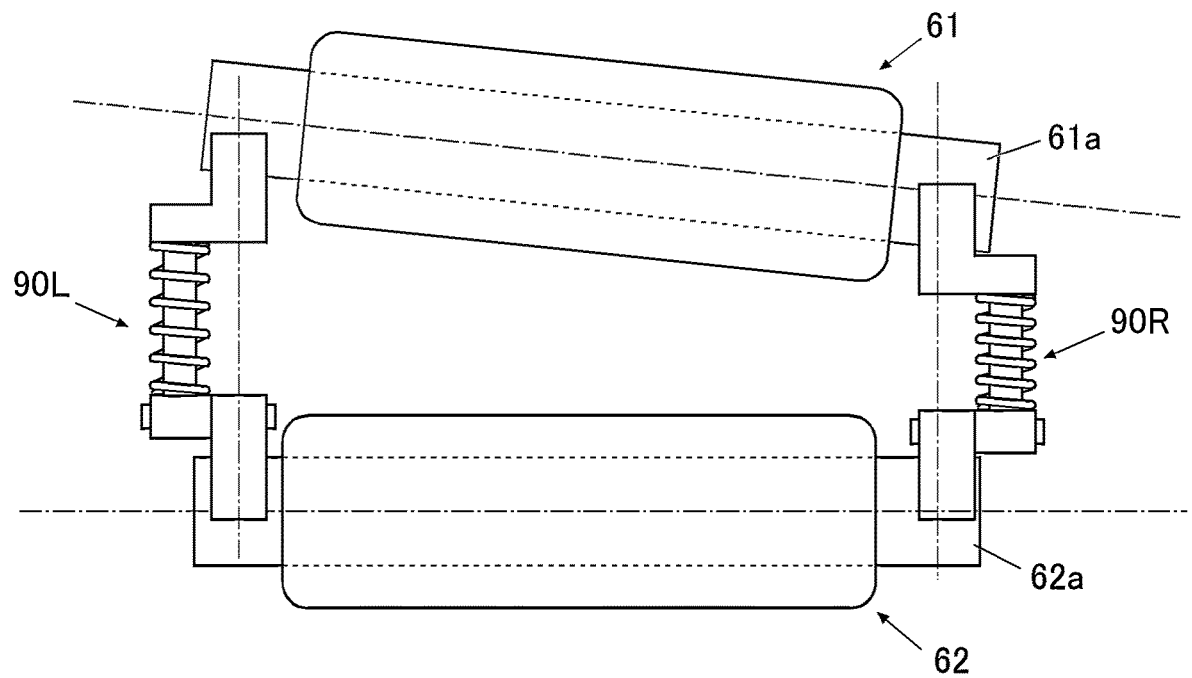
FIG. 6 is a side view of two inter-shaft distance measuring devices and two shafts to be measured.

As shown in FIG. 6, the image forming apparatus 1 may include two or more inter-shaft distance measuring devices 90L and 90R that are installed at different positions in the axial direction for the same shafts 61a and 62a. This makes it possible to detect pitch irregularity due to vibration caused by eccentrics of the upper and lower rollers 61 and 62, and roller tilting due to one-sided wear in the longitudinal direction.

Figure 7:
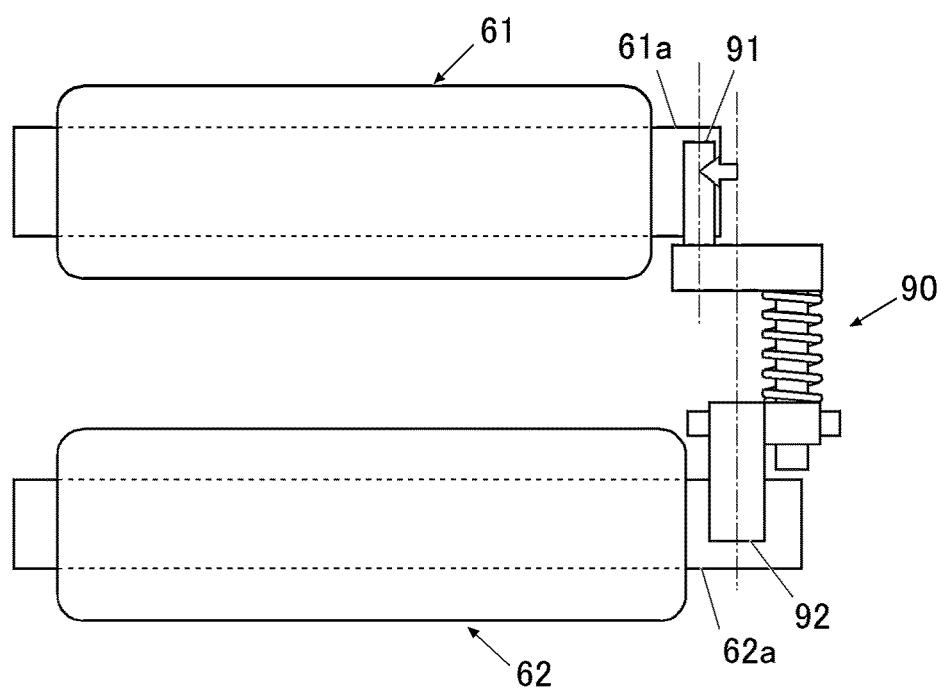
FIG. 7 is a side view of one inter-shaft distance measuring device and two shafts to be measured.

As shown in FIG. 7, the first measuring element 91 and the second measuring element 92 are fixed with an offset in the axial direction of the two shafts 61a and 62a. This makes it possible to deal with the situation where the range in which the measuring element can be in contact in the axial direction is different for the shaft 61a and the shaft 62a. In order to flexibly deal with offset values (including offset 0) different in the same inter-shaft distance measuring device 90, the inter-shaft distance measuring device 90 may be configured such that the offset amount is selectable. A mechanism that allows selection of the offset amount may be, for example, a mechanism that can guide a member of the first measuring element 91 slidably at a part where contacting the shaft 61a to fix the position as needed, or a mechanism that changes the offset amount by changing the attachment direction of the member.

Second Embodiment

Hereinafter, embodiments of variations based on the first embodiment are described. The same reference numerals are given to the same configurations, and the description thereof are omitted.

Here, the second embodiment is described with reference to FIG. 8.

Figure 8:
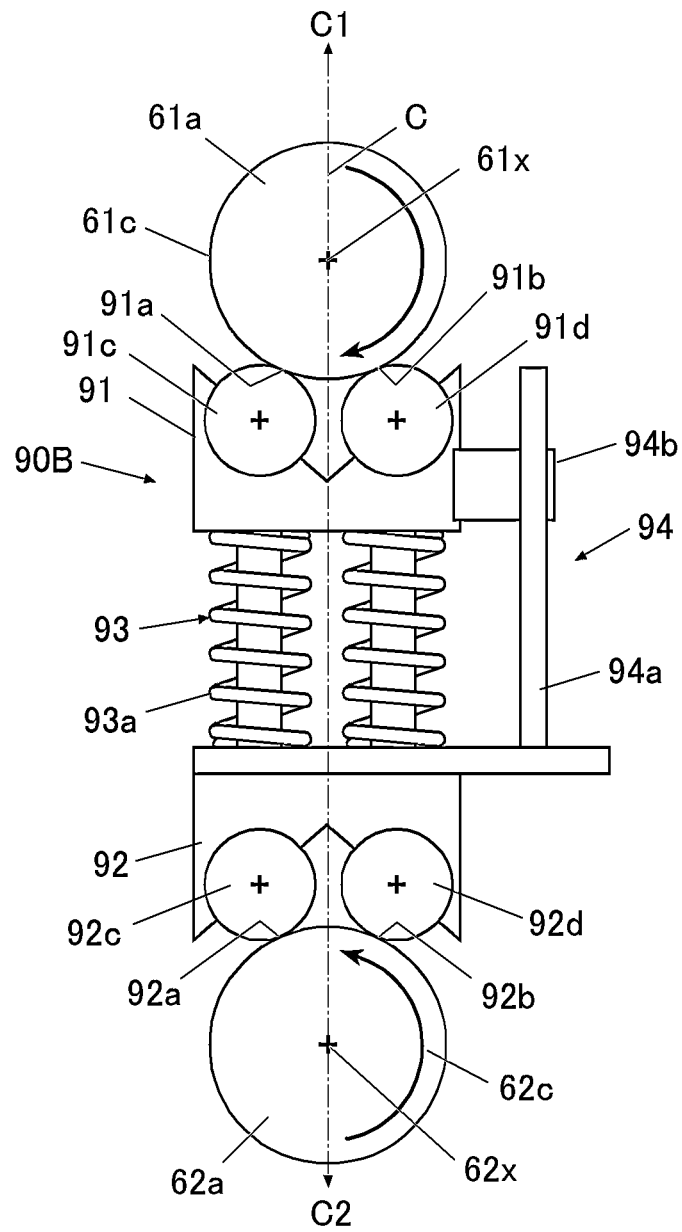
FIG. 8 is a front view of an inter-shaft distance measuring device and two shafts to be measured in a second embodiment.

In the inter-shaft distance measuring device 90B shown in FIG. 8, the first measuring element 91 that is in contact with the peripheral surface 61c at the positions 91a and 91b includes rolling bearings 91a and 91b respectively for the positions 91a and 91b. As described above, the first measuring element 91 contacts the peripheral surface 61c of the shaft 61a at the positions 91a and 91b. The contacting members are the rolling bearings 91c and 91d.

In the inter-shaft distance measuring device 90B shown in FIG. 8, the second measuring element 92 that is in contact with the peripheral surface 62c at the positions 92a and 92b similarly includes rolling bearings 92a and 92b respectively at the positions 92a and 92b.

As a result, the state at the time of measurement is stably maintained when the upper roller 61 and the lower roller 62 are rotated, allowing accurate measurement. For example, in the case where the inter-shaft distance measuring device 90B is incorporated in the image forming apparatus 1 when being shipped and used, the inter-shaft distance may be accurately measured while the upper roller 61 and/or the lower roller 62.

The rolling bearings 91c, 91d, 92c, and 92d may be a roller (cylindrical) or a sphere.

Third Embodiment

Next, the third embodiment is described with reference to FIG. 9.

Figure 9:
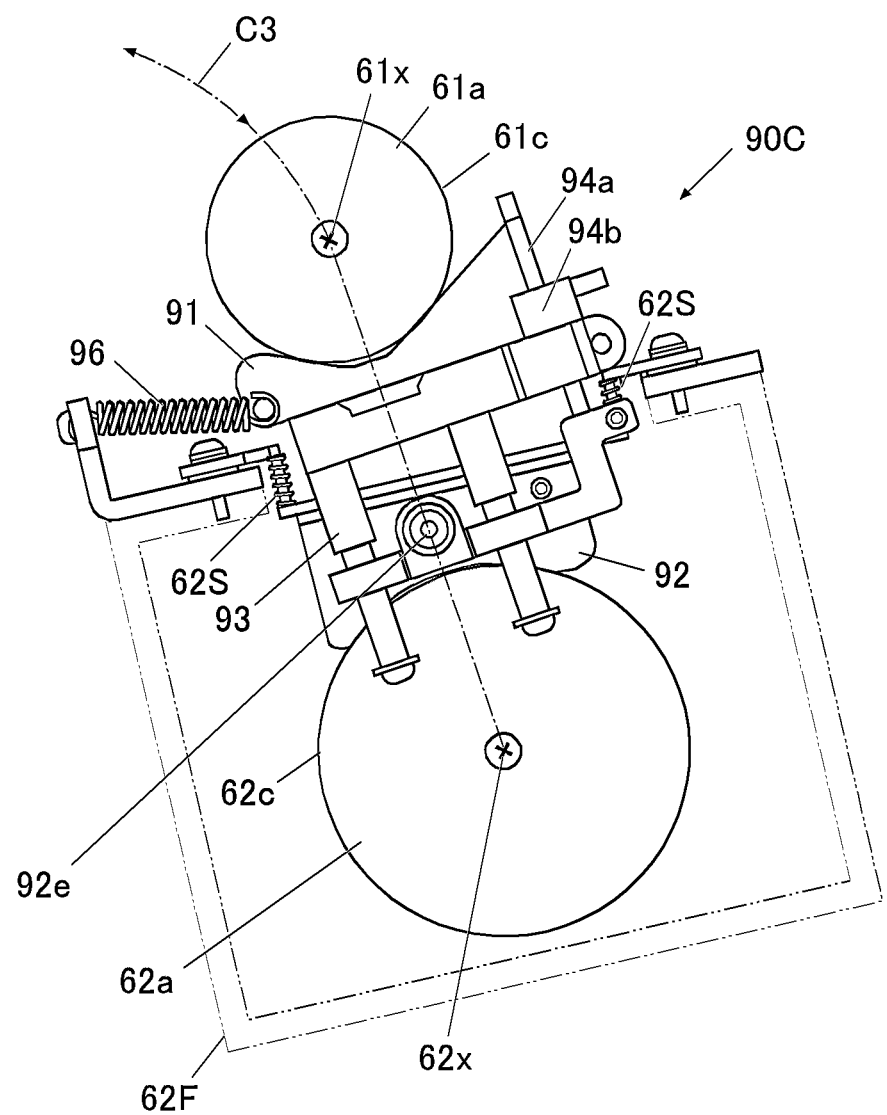
FIG. 9 is a front view of an inter-shaft distance measuring device and two shafts to be measured in a third embodiment.

The inter-shaft distance measuring device 90C shown in FIG. 9 includes an elastic connector 62S to fix one of the first measuring element 91 and the second measuring element 92 (the second measuring element 92 in this embodiment) to a support frame 62F of the shaft 62a that is in contact with that one of the measuring elements in the state where the measuring element 92 is pressed to the shaft 62a by an elastic force.

The approaching and separating actions of the two shafts 61a and 62a include pressing and detaching strokes when the image forming apparatus 1 is in operation, and a stroke (hereinafter referred to as a "releasing stroke") to separate the two shafts over the maximum distance of the pressing and detaching strokes for maintenance or the like. The pressing and detaching strokes are in the range varied by the drive force. A linear stroke of the linear movement mechanism 93 follows the pressing and detaching strokes at least. The approaching and separating actions of the shafts 61a and 62a may be realized such that one of the shafts is movable with respect to the image forming apparatus 1 and the other is fixed or such that the both are movable. If only one of the shafts is movable, whichever one of the two shafts may be movable.

All or part of the strokes including the pressing and separating strokes and the releasing stroke may take a linear trajectory. All or part of the strokes including the pressing and separating strokes and the releasing stroke may take an circular trajectory.

The shaft 61a may not be directly above the shaft 62a and may be diagonally above the shaft 62a constantly or depending on the position during a stroke.

Due to the above-described circumstances, the holding force of the inter-shaft distance measuring device 90 between the two shafts 61a and 62a is reduced to be insufficient or lost, resulting in the fall of the inter-shaft distance measuring device 90C. A typical example is when the linear movement of the linear movement mechanism 93 in the state at the time of measurement is inclined and the shaft 61a is separated from the first measuring element 91. Once the inter-shaft distance measuring device 90C falls off at such a time, the inter-shaft distance measuring device 90C does not fit between the two shafts 61a and 62a even if the two shafts 61a and 62a approach each other, and cannot be restored to the state at the time of measurement.

Thus, in this embodiment, the second measuring element 92 is fixed to the support frame 62F of the shaft 62a. The support frame 62F is a frame supporting the shaft 62a rotatably around its central axis, and moves in accompany with the shaft 62a in the case where the shaft 62a is movable to modify the inter-shaft distance. As the second measuring element 92 is fixed to the support frame 62F, the second measuring element 92 may be fixed in contact with the peripheral surface 62c of the shaft 62a.

However, problematically, the second measuring element 92 may float from the peripheral surface 62c of the shaft 62a or cause an excessive pressing force, affected by the component accuracy or the assembly accuracy.

Thus, the second measuring element 92 is fixed in a state where the second measuring element 92 is appropriately pressed against the shaft 62a by the elastic connector 62S. This makes it possible to prevent the above-described problem and stably and accurately perform measurement.

The elastic connector 62S may be a coil spring, a plate spring, or the like. A bracket incorporating the elastic connector 62S may be in any shape or of any structure, and may be designed as desired.

As the second measuring element 92 is fixed to the support frame 62F of the shaft 62a, there is a risk of deterioration of the ability of tracking all the strokes above. A typical example is the case where all or part of the strokes take a circular trajectory.

Thus, in the inter-shaft distance measuring device 90C in this embodiment, one of the first measuring element 91 and the second measuring element 92 (the second measuring element 92 in this embodiment) is connected to the linear movement mechanism 93 via a fulcrum 92e of rotation around the axis parallel to the shaft 62a that is in contact with the measuring element 92.

This varies the angle of the first measuring element 91 observed with respect to the second measuring element 92 as a reference and makes it easier for the first measuring element 91 to follow the shaft 61a, and the measurement accuracy is secured.

As the angle of the first measuring element 91 observed with respect to the second measuring element 92 as a reference is varied, the first measuring element 91 may not be at a regular position when the shaft 61a is separated from the first measuring element 91 by the releasing stroke. Then, the shaft 61a may not be held by the first measuring element 91 when the shaft 61a approaches and contacts the first measuring element 91 again. Here, the shaft 61a approaches and separates from the first measuring element 91 along the circular trajectory C3 in the drawing.

The inter-shaft distance measuring device 90C in this embodiment then includes an elastic regulating mechanism 96 that regulates the angle between the first measuring element 91 and the second measuring element 92 with respect to the fulcrum of rotation 92e as the center to a predetermined original angle.

The elastic regulating mechanism 96 is a tensile coil spring or the like, and stably maintains the position where the shaft 61a approaches the first measuring element 91 again by pulling the first measurement element 91 toward the left in FIG. 9. This makes it possible to stably restore the state at the time of measurement after the shaft 61a is separated from the first measuring element 91, allowing accurate measurement.

Fourth Embodiment

Next, the fourth embodiment is described with reference to FIGS. 10 and 11.

In the above-described third embodiment, the rotation fulcrum 92e is separated from the center line 62x of the shaft 62a. In that case, there is no practical problem as long as the center line 61x of the shaft 61a is mostly converged on a straight line connecting the center line 62x and the rotation fulcrum 92e at least in the stroke to be measured (the stroke when the two shafts are pressed). It is possible to modify the measurement value on a computer as necessary because a relative positional relationship among the center line 61x, the center 62x, and the rotation fulcrum 92e varies constantly (always change on the same trajectory).

Figure 10:
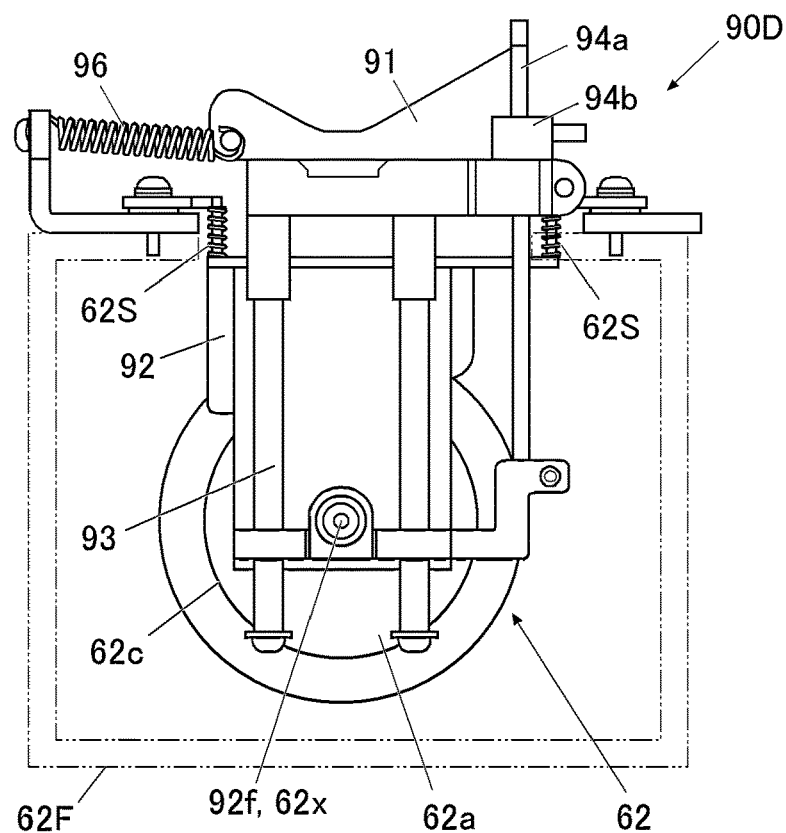
FIG. 10 is a front view of an inter-shaft distance measuring device and two shafts to be measured in a fourth embodiment.
Figure 11:
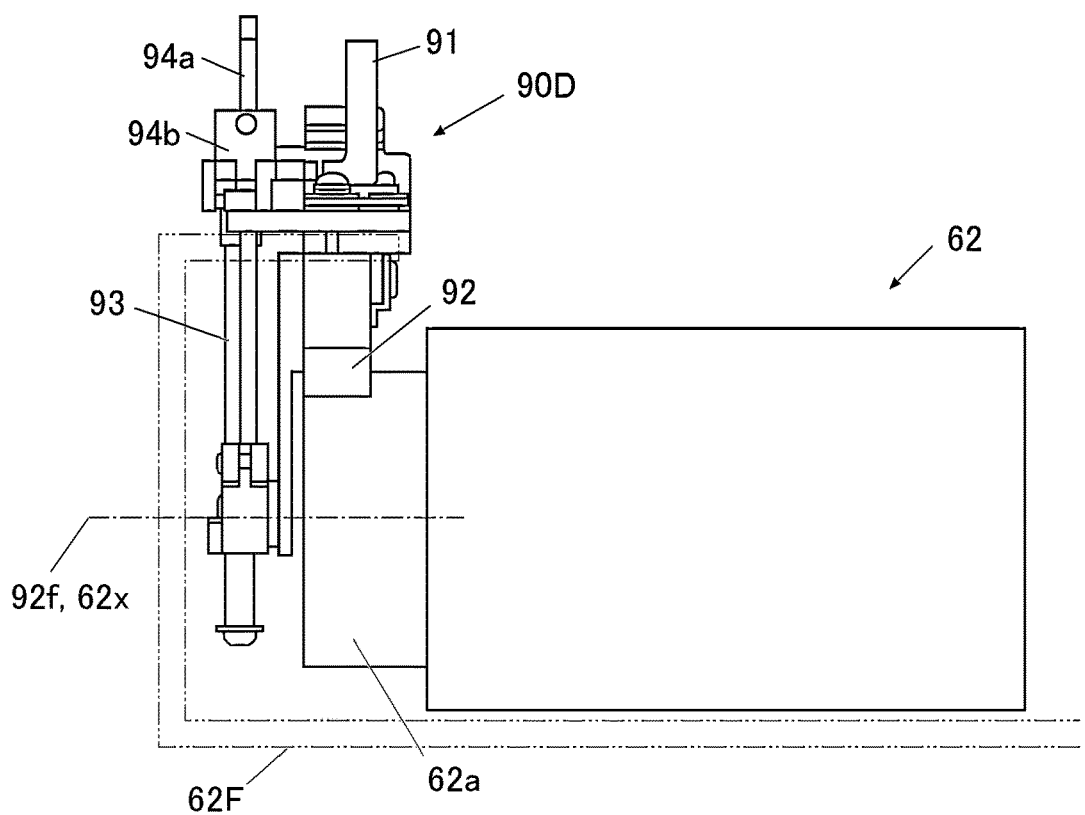
FIG. 11 is a side view of the inter-shaft distance measuring device and the two shafts to be measured in the fourth embodiment.

In the inter-shaft distance measuring device 90D in the embodiment shown in FIGS. 10 and 11, one (the second measuring element 92 in this embodiment) of the first measuring element 91 and the second measuring element 92 is connected to the linear movement mechanism 93 via the fulcrum of rotation 92f around the shaft 62a that is in contact with the connected measuring element 92.

This makes it possible to perform accurate measurement because the distance measured by the measurer 94 is always the distance between the two shafts 61a and 62a regardless of the relative angle between the first measuring element 91 and the second measuring element 92 from the fulcrum of rotation 92f.

However, since the inter-shaft distance measuring device 90D is comparatively long and large, the inter-shaft distance measuring device 90C in the above-described third embodiment is to be applied depending on the equipment configuration of the image forming apparatus 1.

Fifth Embodiment

Next, the fifth embodiment is described with reference to FIG. 12.

The inter-shaft distance measuring device 90E is different from the above-described first embodiment in the following points.

Figure 12:
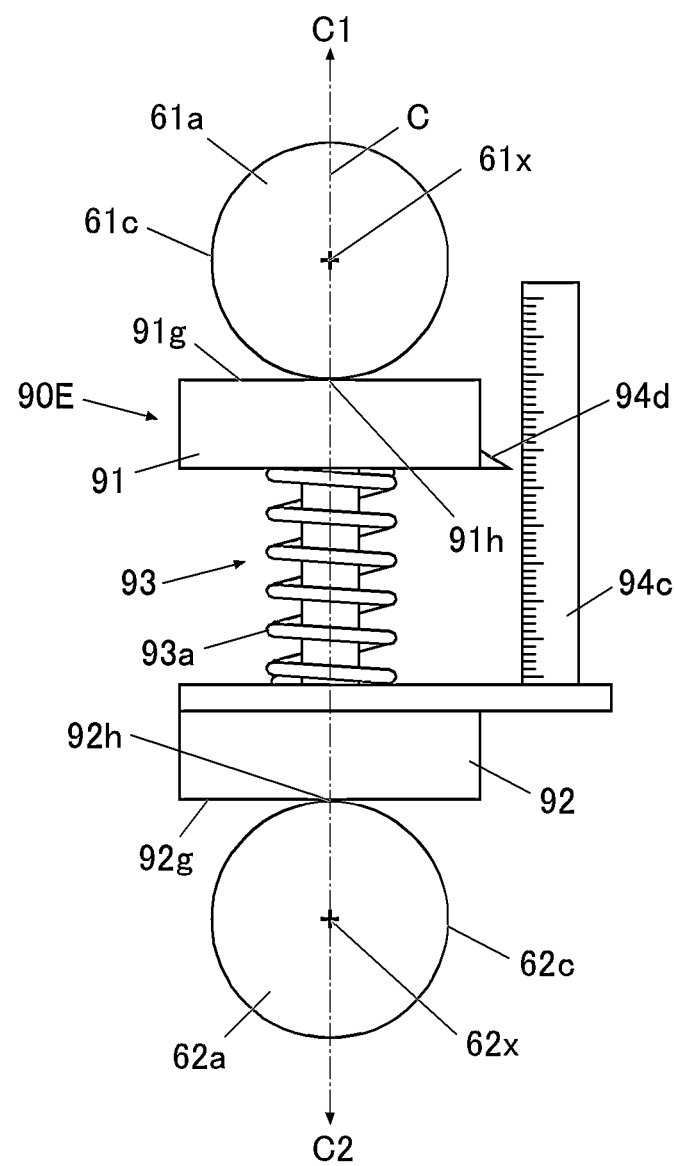
FIG. 12 is a front view of an inter-shaft distance measuring device and two shafts to be measured in a fifth embodiment.

As shown in FIG. 12, in the inter-shaft distance measuring device 90E in this embodiment, contacting surfaces 91g and 92g of the first measuring element 91 and the second measuring element 92 are planes perpendicular to the direction of the linear movement (the direction of the line C) of the linear movement mechanism 93. When observed in the axial direction as shown in FIG. 12, the contacting point between the peripheral surface 61c and the contacting surface 91g is guided to a point 91h and the contacting point between the peripheral surface 62c of the shaft 62a and the contacting surface 92g is guided to a point 92h by the pressing force of the moving mechanism 93. The inter-shaft distance measuring device 90E may be maintained between the two shafts 61 and 62. The inter-shaft distance measuring device 90E as this can accurately and stably measure the distance between the two shafts 61 and 62.

A ruler 94c fixed with respect to the second measuring element 92 and a pointer fixed with respect to the first measuring element 91 are shown as examples of the measuring means. The moving mechanism 93 with a single pillar is shown as an example.

Some embodiments of the present invention are described hereinbefore. The scope of the present invention is not limited to the above-described embodiment, and includes various modifications within the scope of the claims of the present invention.

In the above embodiments, the pair of the fixing rollers 61 and 62 are measured, but a pair of rollers other than the fixing rollers, such as the conveying rollers, may be measured.

As the inter-shaft distance measuring device is installed for the pair of the conveying rollers and connected to the above-described display, the inter-shaft distance may be measured in real time even during transport. Thus, it is possible to apply the present invention to detection of presence of an object that passes through, measurement of a width of an object that passes through, detection of a foreign substance that passes through, or the like.

What is claimed is:

1. An inter-shaft distance measuring device for measuring a distance between two shafts or an amount of a change in the distance comprising:
a first measuring element that is in contact with a first peripheral surface of a first shaft of the two shafts at a time of measurement and that is used as a first measurement reference;
a second measuring element that is in contact with a second peripheral surface of a second shaft of the two shafts at the time of the measurement and that is used as a second measurement reference;
a moving mechanism that includes an elastic member and that holds the first measuring element and the second measuring element so as to move the first measuring element and the second measuring element relatively to each other and adds a force in opposite directions in which the first measuring element and the second measuring element are separated from each other by an elastic force of the elastic member; and
a measurer that measures the change in the distance between the first measuring element and the second measuring element caused by the moving mechanism,
wherein in a state at the time of the measurement, the first measuring element and the second measuring element inserted between the two shafts add a pressing force by the moving mechanism respectively to the two shafts in directions in which the distance between the two shafts is widened, and the state at the time of the measurement is maintainable.

2. The inter-shaft distance measuring device according to claim 1, wherein, when observed in an axial direction of the two shafts, one or both of the first measuring element and the second measuring element is each in contact with a peripheral surface of one or both of the two shafts corresponding to the one or both of the first measuring element and the second measuring element each at two points that are on opposite sides with respect to a line passing through a center line of the first shaft and a center line of the second shaft as a boundary.

3. The inter-shaft distance measuring device according to claim 2,
wherein the first measuring element and/or the second measuring element in contact with the peripheral surface at the two points includes a rolling bearing at each of the two points.

4. The inter-shaft distance measuring device according to claim 1,
wherein, when observed in an axial direction of the two shafts, a center of the first measuring element and a center of the second measuring element are on a line of action of a combined force of the elastic force of the elastic member.

5. The inter-shaft distance measuring device according to claim 1, further comprising:
an electronic length measuring device as the measurer.

6. The inter-shaft distance measuring device according to claim 5, further comprising:
a calibration master that is used as a reference of a design dimension of an object to be measured,
wherein a point zero of measurement based on the electronic length measuring device is settable.

7. The inter-shaft distance measuring device according to claim 5,
wherein the electronic length measuring device is a length measuring device using a differential transformer displacement sensor.

8. The inter-shaft distance measuring device according to claim 5, further comprising:
a display that shows a measurement value according to an output signal of the electronic length measuring device.

9. The inter-shaft distance measuring device according to claim 1,
wherein the pressing force on the two shafts is in a range that does not affect a measurement accuracy of the measurer.

10. The inter-shaft distance measuring device according to claim 1,
wherein one measuring element of the first measuring element and the second measuring element is connected to the moving mechanism via a fulcrum of rotation around an axis parallel to the first shaft or the second shaft that is in contact with the one measuring element connected to the moving mechanism.

11. The inter-shaft distance measuring device according to claim 1,
wherein one measuring element of the first measuring element and the second measuring element is connected to the moving mechanism via a fulcrum of rotation around the first shaft or the second shaft that is in contact with the one measuring element connected to the moving mechanism.

12. The inter-shaft distance measuring device according to claim 10, comprising:
an elastic regulating mechanism that regulates an angle between the first measuring element and the second measuring element from the fulcrum of rotation at a predetermined original angle.

13. The inter-shaft distance measuring device according to claim 1,
wherein the first peripheral surface and the second peripheral surface that are respectively in contact with the first measuring element and the second measuring element are each a peripheral surface of a metal rod forming a roller shaft.

14. The inter-shaft distance measuring device according to claim 1,
a material forming the inter-shaft distance measuring device resists at least a temperature range of a usage environment of the two shafts.

15. The inter-shaft distance measuring device according to claim 1,
wherein the first measuring element and the second measuring element are fixed with an offset in an axial direction of the two shafts or configured such that an amount of the offset is selectable.

16. The inter-shaft distance measuring device according to claim 1, further comprising:
an elastic connector for fixing one measuring element of the first measuring element and the second measuring element to a support frame of the first shaft or the second shaft corresponding to the one measuring element in a state where the one measuring element is pressed against the first shaft or the second shaft corresponding to the one measuring element by an elastic force.

17. The inter-shaft distance measuring device according to claim 1,
wherein the moving mechanism is a linear motion mechanism that moves linearly.

18. An image forming apparatus comprising:
the inter-shaft distance measuring device according to claim 1.

19. The image forming apparatus according to claim 18,
the inter-shaft distance measuring device includes two or more inter-shaft distance measuring devices that are installed for a set of two shafts at positions different from each other in an axial direction.

20. The image forming apparatus according to claim 18, further comprising:
a controller that is capable of receiving an output signal of the inter-shaft distance measuring device and that is capable of monitoring the distance between the two shafts or controlling an image formation condition according to the output signal.

* * * * *